United States Patent [19]

Hunter

[11] 4,179,835

[45] Dec. 25, 1979

[54] SMALL ANIMAL TRAP

[76] Inventor: Robert F. Hunter, 119 Bowie St., Abbeville, S.C. 29620

[21] Appl. No.: 944,295

[22] Filed: Sep. 21, 1978

[51] Int. Cl.² .......................................... A01M 23/18
[52] U.S. Cl. ...................................................... 43/61
[58] Field of Search ..................................... 43/61, 60

[56] References Cited

U.S. PATENT DOCUMENTS

| 844,517 | 2/1907 | Haas | 43/61 |
|---|---|---|---|
| 1,345,716 | 7/1920 | Sudul | 43/61 |
| 1,421,298 | 6/1922 | Paetta | 43/61 |
| 1,990,861 | 2/1935 | Exum | 43/61 |
| 3,113,395 | 12/1963 | Van Kuren | 43/61 |

Primary Examiner—Nicholas P. Godici
Attorney, Agent, or Firm—Daniel Jay Tick

[57] ABSTRACT

A lever is pivotally mounted in the back of a cage at the center of the lever and is balanced therein. The lever has a first end in the cage with a tray thereon for bait and a spaced opposite second end movably positioned between a first pair of spaced parallel posts supported a predetermined distance from the back of the cage. A trip rod has a length longer than the distance between the posts and rests on the lever between the posts and the cage. A cord has a first end affixed to the front bottom edge of a trap door hingedly affixed to the top of the cage at the front thereof and a spaced opposite second end affixed to the center of the trip rod. The cord is guided along the top of the cage and around the cross bar in a manner whereby the trap door is held open and when an animal depresses the front end of the lever by taking the bait, the second end of the lever moves upward and knocks the trip rod free thereby slackening the cord so that the trap door is released and closed.

1 Claim, 5 Drawing Figures

U.S. Patent
Dec. 25, 1979
4,179,835
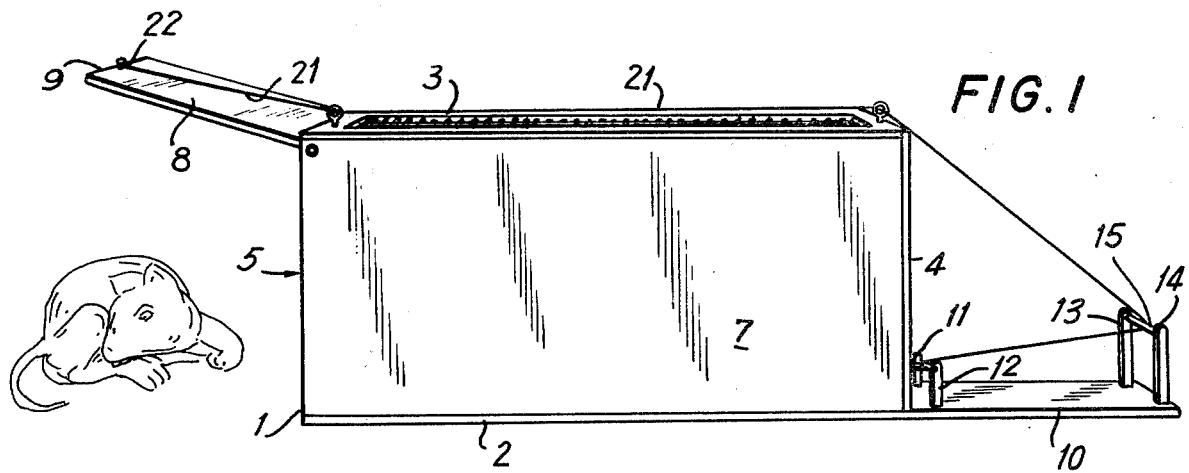
FIG.1
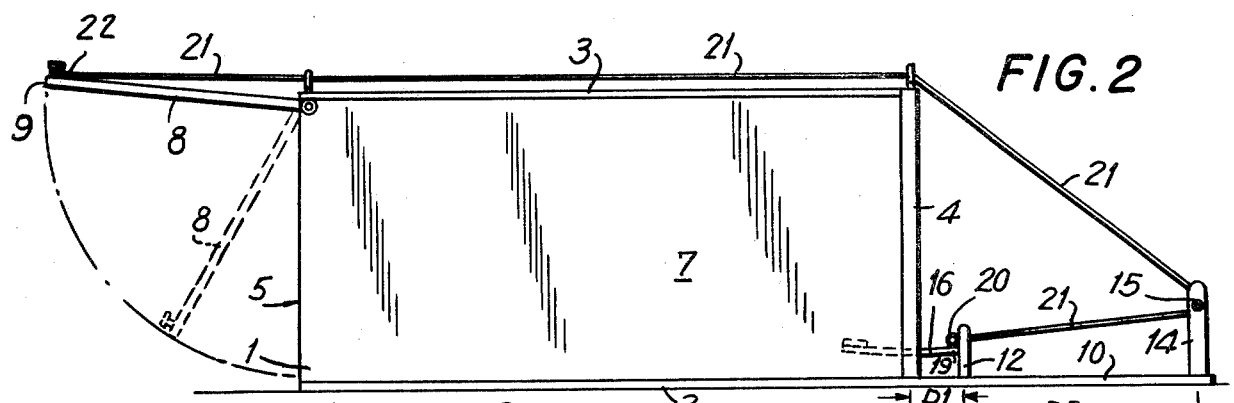
FIG.2
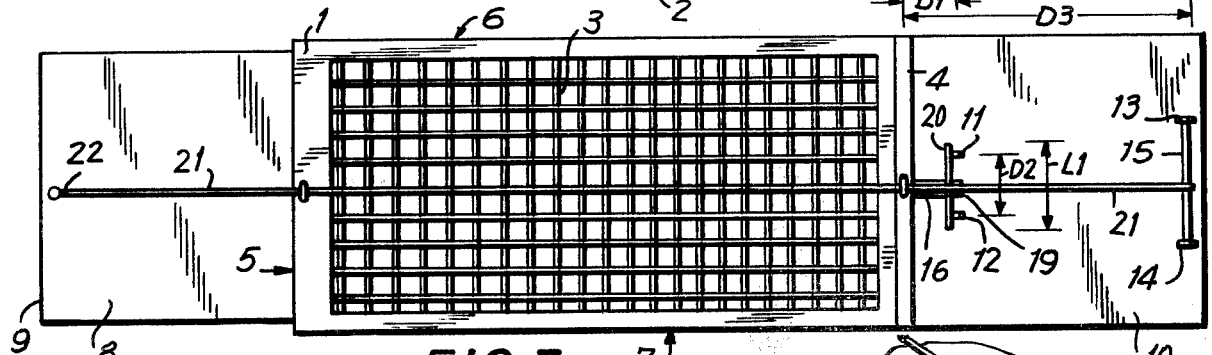
FIG.3
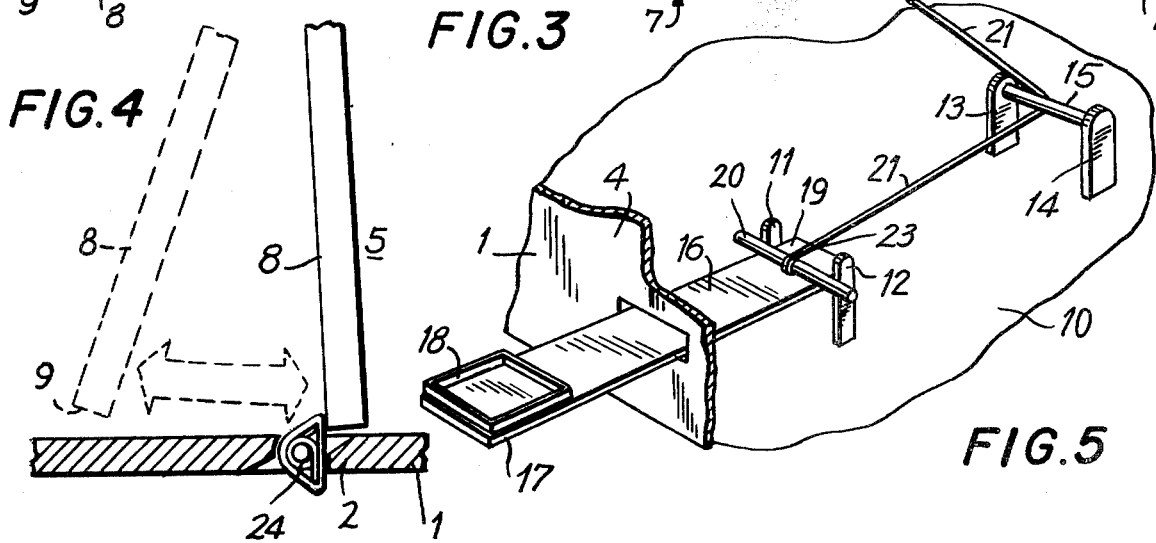
FIG.4
FIG.5

SMALL ANIMAL TRAP

BACKGROUND OF THE INVENTION

The present invention relates to a small animal trap. More particularly, the invention relates to a small animal trap having a cage with a bottom, a top, a back, an open front and sides joining the top, bottom and back.

Objects of the invention are to provide a small animal trap of simple structure, which is inexpensive in manufacture, and functions efficiently, effectively and reliably to trap a small animal, without failure, and without injuring or killing the animal.

Small animal traps are disclosed in the following United States patents. U.S. Pat. No. 844,517, issued Feb. 19, 1907 to Hass, U.S. Pat. No. 1,990,861, issued Feb. 12, 1935 to Exum, U.S. Pat. No. 2,038,068, issued Apr. 21, 1936 to Wagner, U.S. Pat. No. 2,502,836, issued Apr. 4, 1950 to Eggering, U.S. Pat. No. 2,793,464, issued May 28, 1957 to Bird and U.S. Pat. No. 3,975,857, issued Aug. 24, 1976 to Branson et al.

BRIEF DESCRIPTION OF THE DRAWINGS

In order that the invention may be readily carried into effect, it will now be described with reference to the accompanying drawings, wherein:

FIG. 1 is a perspective view of an embodiment of the small animal trap of the invention;

FIG. 2 is a side view of the embodiment of FIG. 1;

FIG. 3 is a top view of the embodiment of FIG. 1;

FIG. 4 is a view, on an enlarged scale, partly in section, illustrating a latch device for securing the trap door in closed position; and FIG. 5 is a perspective view, on an enlarged scale, of the lever of the small animal trap of the invention.

DETAILED DESCRIPTION OF THE INVENTION

The small animal trap of the invention has a cage 1 with a bottom 2 (FIGS. 1, 2 and 4), a top 3 (FIGS. 1 to 3), a back 4 (FIGS. 1 to 3 and 5), an open front 5 (FIGS. 1 to 4) and sides 6 and 7 (FIG. 3) joining the top, bottom and back.

The small animal trap of the invention comprises a trap door 8 (FIGS. 1 to 4) hingedly affixed to the top 3 of the cage 1 at the front 5 thereof, as shown in FIGS. 1 to 3. The trap door 8 has a front bottom edge 9 (FIGS. 1 to 4).

A support member 10 extends beyond the back 4 of the cage 1 substantially coplanarly with the bottom 2 of said cage, as shown in FIGS. 1 to 3 and 5.

A first pair of spaced parallel posts 11 and 12 (FIGS. 1, 3 and 5) extend substantially perpendicularly from the support member 10 at a predetermined distance D1 (FIG. 2) from the back 4 of the cage 1 and predetermined distance D2 (FIG. 3) from each other.

a second pair of spaced parallel posts 13 and 14 (FIGS. 1, 3 and 5) extend substantially perpendicularly from the support member 10 at a greater distance D3 (FIG. 2) from the back 4 of the cage 1 than the predetermined distance D1. The second pair of posts 13 and 14 have a cross bar 15 affixed thereto and extending therebetween substantially parallel to the support member 10 and spaced thereabove, as shown in FIGS. 1 to 3 and 5.

A lever 16 (FIGS. 2, 3 and 5) is mounted in the back 4 of the cage 1 at the center of said lever and is balanced in said back, as shown in FIG. 5. The lever 16 has a first end 17 in the cage 1 with a tray 18 thereon for bait, as shown in FIG. 5. The lever 16 also has a spaced opposite second end 19 movably positioned between the first pair of posts 11 and 12, as shown in FIGS. 2, 3 and 5.

A trip rod 20 (FIGS. 2, 3 and 5) has a length L1 (FIG. 3) longer than the predetermined distance D2 between the first pair of posts 11 and 12. The trip rod 20 rests on the lever 16 between the posts 11 and 12 and the cage 1, as shown in FIGS. 2, 3 and 5.

A cord 21 (FIGS. 1 to 4 and 5) has a first end 22 (FIGS. 1 to 3) affixed to the front bottom edge 9 of the trap door 8 and a spaced opposite second end 23 (FIG. 5) affixed to the center of the trip rod 20. The cord 21 is guided along the top 3 of the cage 1 and around the cross bar 15, as shown in FIGS. 1 to 3 and 5, in a manner whereby the trap door 8 is held open. When an animal enters the cage 1 and depresses the first end 17 of the lever 16 by holding said end down in order to take the bait, the second end 19 of the lever moves upward and knocks the trip rod 20 free, thereby slackening the cord 21 so that the trap door 8 is released and closed, as shown by broken lines in FIG. 2 and by solid lines in FIG. 4.

A spring-biased latch device 24 is rotatably mounted in a hole in the bottom 2 of the cage 1, at the open front 5 of said cage, as shown in FIG. 4. When the trap door 8 closes, it rotates the latch device 24 so that after said trap door is in closed position, said latch device is in its securing position, in which it secures said trap door and prevents it from being pushed open by the animal in the cage.

While the invention has been described by means of a specific example and in a specific embodiment, I do not wish to be limited thereto, for obvious modifications will occur to those skilled in the art without departing from the spirit and scope of the invention.

I claim:

1. A small animal trap having a cage with a bottom, a top, a back, an open front and sides joining the top, bottom and back, said small animal trap comprising:

a trap door hingedly affixed to the top of the cage at the front thereof, said trap door having a front bottom edge;

a support member extending beyond the back of said cage substantially coplanarly with the bottom thereof;

a first pair of spaced parallel posts extending substantially perpendicularly from the support member at a predetermined distance from the back of the cage and a predetermined distance from each other;

a second pair of spaced parallel posts extending substantially perpendicularly from the support member at a greater distance from the back of the cage than the predetermined distance and having a cross bar affixed thereto and extending therebetween substantially parallel to said support member and spaced thereabove;

a lever pivotally mounted in the back of said cage at the center of the lever and balanced therein, said lever having a first end in the cage with a tray thereon for bait and a spaced opposite second end movably positioned between the first pair of posts;

a trip rod having a length longer than the predetermined distance between said firt pair of posts and resting on said lever between said posts and said cage; and a cord having a first end affixed to the front bottom edge of said trap door and a spaced opposite second end affixed to the center of said trip rod, said cord being guided along the top of said cage and around said cross bar in a manner whereby said trap door is held open and when an animal depresses the first end of said lever by taking the bait, the second end of said lever moves upward and knocks said trip rod free thereby slackening the cord so that said trap door is released and closed.

* * * * *